US011636033B2

(12) United States Patent
Gorobets et al.

(10) Patent No.: US 11,636,033 B2
(45) Date of Patent: Apr. 25, 2023

(54) SYSTEM AND METHOD OF DIRECT WRITE AND MAPPING OF DATA IN A NON-VOLATILE MEMORY HAVING MULTIPLE SUB-DRIVES

(71) Applicant: Western Digital Technologies, Inc., San Jose, CA (US)

(72) Inventors: Sergey Anatolievich Gorobets, Edinburgh (GB); Liam Michael Parker, Edinburgh (GB)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/235,816

(22) Filed: Apr. 20, 2021

(65) Prior Publication Data

US 2021/0240614 A1     Aug. 5, 2021

Related U.S. Application Data

(63) Continuation of application No. 16/554,527, filed on Aug. 28, 2019, now Pat. No. 11,016,882, which is a
(Continued)

(51) Int. Cl.
*G06F 12/02* (2006.01)
*G06F 12/10* (2016.01)
*G06F 3/06* (2006.01)

(52) U.S. Cl.
CPC .......... *G06F 12/0253* (2013.01); *G06F 3/064* (2013.01); *G06F 3/0613* (2013.01);
(Continued)

(58) Field of Classification Search
CPC .. G06F 12/0246; G06F 12/0253; G06F 12/10; G06F 3/064; G06F 3/0688;
(Continued)

(56) References Cited

U.S. PATENT DOCUMENTS 8,239,639 B2    8/2012  Sinclair
8,261,009 B2    9/2012  Freikorn
(Continued)

*Primary Examiner* — Hashem Farrokh
(74) *Attorney, Agent, or Firm* — Morgan Lewis & Bockius LLP

(57) ABSTRACT

A system and method is disclosed for managing data in a non-volatile memory. The system may include a non-volatile memory having multiple non-volatile memory sub-drives. A controller of the memory system is configured to route incoming host data to a desired sub-drive, keep data within the same sub-drive as its source during a garbage collection operation, and re-map data between sub-drives, separate from any garbage collection operation, when a sub-drive overflows its designated amount logical address space. The method may include initial data sorting of host writes into sub-drives based on any number of hot/cold sorting functions. In one implementation, the initial host write data sorting may be based on a host list of recently written blocks for each sub-drive and a second write to a logical address encompassed by the list may trigger routing the host write to a hotter sub-drive than the current sub-drive.

20 Claims, 15 Drawing Sheets

Related U.S. Application Data continuation of application No. 15/954,171, filed on Apr. 16, 2018, now Pat. No. 10,409,720.

(60) Provisional application No. 62/518,513, filed on Jun. 12, 2017.

(52) U.S. Cl.
CPC .......... *G06F 3/0616* (2013.01); *G06F 3/0652* (2013.01); *G06F 3/0665* (2013.01); *G06F 3/0688* (2013.01); *G06F 12/0246* (2013.01); *G06F 12/10* (2013.01); *G06F 2212/1044* (2013.01); *G06F 2212/2022* (2013.01); *G06F 2212/7201* (2013.01); *G06F 2212/7205* (2013.01)

(58) Field of Classification Search
CPC .... G06F 3/0652; G06F 3/0665; G06F 3/0613; G06F 3/0616; G06F 2212/7204; G06F 2212/7205; G06F 2212/7208; G06F 2212/1044; G06F 2212/7201; G06F 2212/2022
USPC ........................................................ 711/103
See application file for complete search history.

(56) References Cited

U.S. PATENT DOCUMENTS

| | | | |
|---|---|---|---|
| 9,021,231 | B2 | 4/2015 | Fitzpatrick et al. |
| 9,176,864 | B2 | 11/2015 | Gorobets et al. |
| 9,286,202 | B1 * | 3/2016 | Zhou .................... G06F 11/1088 |
| 10,032,488 | B1 | 7/2018 | Kathawala |
| 11,016,882 | B2 * | 5/2021 | Gorobets .............. G06F 3/0665 |
| 2012/0059978 | A1 | 3/2012 | Rosenband et al. |
| 2012/0297122 | A1 | 11/2012 | Gorobets et al. |
| 2013/0061019 | A1 | 3/2013 | Fitzpatrick et al. |
| 2017/0285948 | A1 | 10/2017 | Thomas et al. |
| 2018/0190329 | A1 * | 7/2018 | Kathawala .......... G06F 12/0246 |
| 2018/0357159 | A1 | 12/2018 | Parker |

\* cited by examiner

SYSTEM AND METHOD OF DIRECT WRITE AND MAPPING OF DATA IN A NON-VOLATILE MEMORY HAVING MULTIPLE SUB-DRIVES

CROSS-REFERENCE TO RELATED APPLICATIONS

This application is a continuation of application Ser. No. 16/554,527, filed on Aug. 28, 2019, now U.S. Pat. No. 11,016,882, which is a continuation of application Ser. No. 15/954,171, filed on Apr. 16, 2018, now U.S. Pat. No. 10,409,720, which claims the benefit of U.S. Provisional Application No. 62/518,513, filed on Jun. 12, 2017, the entirety of each of which is herein incorporated by reference.

BACKGROUND

Storage systems, such as solid state drives (SSDs) including NAND flash memory, are commonly used in electronic systems ranging from consumer products to enterprise-level computer systems. SSDs and similar storage devices utilizing block-oriented architectures share a common issue: the need to create space for writing new data by collecting sparsely distributed data into a smaller number of blocks. This process is referred to as "garbage collection". The need for garbage collection in many block-oriented storage devices is generally due to the inability to write in place to memory, and the mismatch between write granularity and erase granularity in those storage devices.

The garbage collection process may introduce a significant burden on processing resources which, in turn, may reduce SSD performance. Garbage collection involves reading valid data from a block of non-volatile memory that is to be reused and writing it back to a new block. Many real-life data workloads, notably except uniform random and sequential, have different write densities for different logical areas, with some data being 'hot' or frequently written, and 'cold' or less frequently written. When data of different temperatures is mixed together, the SSD can experience significant write amplification, where write amplification refers to the physical amount of data written or copied above the logical amount of data received.

DETAILED DESCRIPTION

Figure 1A:
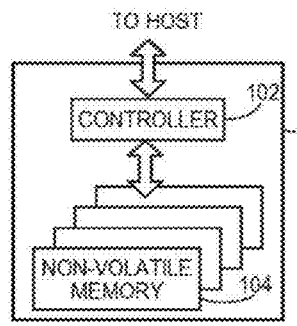
FIG. 1A is a block diagram of an example non-volatile memory system.

In order to address write amplification issues, and to reduce data management overhead burdens that can be created in addressing write amplification issues, a system and method for managing data in a non-volatile memory (NVM) system having multiple sub-drives is disclosed below.

As described herein, write amplification issues that may occur in a legacy NVM system due to the mixture of different data groups, such as different temperature data, may be addressed at several different points in the operation of the NVM system. For example, in one implementation the method and system separates hot/cold data sorting from garbage collection for data that has been already been written to a sub-drive. In another implementation that may be used in combination with, or independently from the separated garbage collection and hot/cold data sorting noted above, the system and method may include an initial sort of data into a desired sub-drive as it is being written from the host.

Thus, aspects that may be usable separately or in combination may include:

Direct Host Write Path

The NVM system may be configured to strive for an optimal direct write data path to different sub-drives, where the host writes are directly routed to separate sub-drives assigned for specific data groups (e.g., 'hot' vs. 'cold') as the intended the final destination. The sub-drive destination decision may be done 'on-the-fly', as the data is written by the host, to obtain a direct write and avoid any penalty of an intermediate write that may require a subsequent sort. The host write of a logical block address (LBA) or logical group may be made to any sub-drive.

Local Garbage Collection

Each sub-drive may have its own independent garbage collection so that no data would move from one sub-drive to another unless resizing is required. This may avoid problems where data would otherwise be re-classified as 'colder' and get moved to another sub-drive just because other data in the block became obsolete and the block was selected for reclaim (garbage collection) operation. As described herein, the new free block generated by the garbage collection operation would go into a shared free block pool and may be reused by either the same sub-drive or a different sub-drive. In different embodiments, the size of a sub-drive may either be fixed or change according to a re-sizing algorithm if the workload changes.

Passive Super-Block Re-Assignment.

If sub-drive re-sizing is triggered, it may be accomplished by making sub-drives smaller via re-assigning the 'coldest' super-block to a 'colder' sub-drive, for example, the next 'colder' sub-drive. The 'coldest' super-blocks may be moved between sub-drives without physically copying data from one sub-drive to another to avoid a write amplification penalty. As described below, the least recently written block may be identified as containing the 'coldest' data in the particular sub-drive. For each sub-drive, the write order of superblocks by the host may be maintained as a basis to determine the temperature of the superblocks.

Overprovisioning Management

As described in greater detail below, the overprovisioning (OP) targets for each sub-drive may be based on a workload analysis for each sub-drive. The workload analysis may be used for calculations of OP, sub-drive sizes and/or data routing and may be based on tracking hit rate per sub-drive, based on the current data location. The target OP of each sub-drive may be determined from the workload analysis and then be used to determine from which sub-drive a source superblock should be selected for garbage collection.

According to a first aspect, a method for managing data in a memory system is disclosed. The method may be executed with a controller in communication with a non-volatile memory having a plurality of sub-drives. The method may include the controller receiving a host data write at the memory system and directing the host data write to one of the plurality of sub-drives based on a first sorting technique. The method may also include initiating a garbage collection operation in a particular sub-drive in response to a detected garbage collection trigger and moving valid data during the garbage collection operation from a source superblock in the particular sub-drive only to a relocation superblock in the particular sub-drive such that the valid data remains in the particular sub-drive. Additionally, the method may include determining whether a proportion of a total logical address space of the non-volatile memory currently associated with one of the plurality of sub-drives exceeds a predetermined threshold. When the proportion exceeds the predetermined threshold for the one of the plurality of sub-drives, the method includes re-mapping a superblock from the one of the plurality of sub-drives to another of the plurality of sub-drives based on a current data temperature of the superblock independently of any garbage collection operation.

According to another aspect, a non-volatile memory system is disclosed. The non-volatile memory system may include a non-volatile memory having a plurality of sub-drives, as well as a controller in communication with the plurality of sub-drives. The controller may be configured to sort data associated with a host write command, as the data is received from a host, into one of the plurality of sub-drives based on a determined data temperature of the data associated with the host write command. The controller may be further configured to sort data, already stored in a first sub-drive of the plurality of sub-drives, into a different sub-drive of the plurality of sub-drives by logically remapping a portion of the data already stored in the first sub-drive, without rewriting the portion of the data into a different physical location, independently of any garbage collection operation in the first sub-drive.

In a further aspect, a method is disclosed for managing data in a non-volatile memory system having a plurality of sub-drives and a controller in communication with the sub-drives. The method may include the controller receiving a host data write at the memory system and directing the host data write to one of the plurality of sub-drives based on a first sorting technique. The method may also include the controller determining whether an amount of valid data in one of the plurality of sub-drives exceeds a predetermined amount of a logical address space for the one of the plurality of sub-drives. When the amount of valid data in the one of the plurality of sub-drives exceeds the predetermined amount, the method includes re-mapping a superblock from the one of the plurality of sub-drives to another of the plurality of sub-drives, without rewriting any data from the superblock to another physical location, based on a current data temperature of the superblock.

Separately or in combination with the above-noted method, a method for initially sorting data in a non-volatile memory system is described. The method may be executed in a non-volatile memory system with a plurality of sub-drives each associated with a different data temperature range. The controller of the system may maintain a list of most recent host data writes for one of the plurality of sub-drives. The method may include comparing the logical addresses of data in a received host write command to logical addresses of data in the list of most recent host data writes for the one of the plurality of sub-drives. When a logical address of data in the received host data write is present in the list, the method includes automatically routing the data in the received host write command to a different one of the plurality of sub-drives associated with a hotter data temperature range than the one of the plurality of sub-drives.

Referring now to FIG. 1A, a block diagram illustrating a non-volatile memory system is shown. The non-volatile memory (NVM) system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
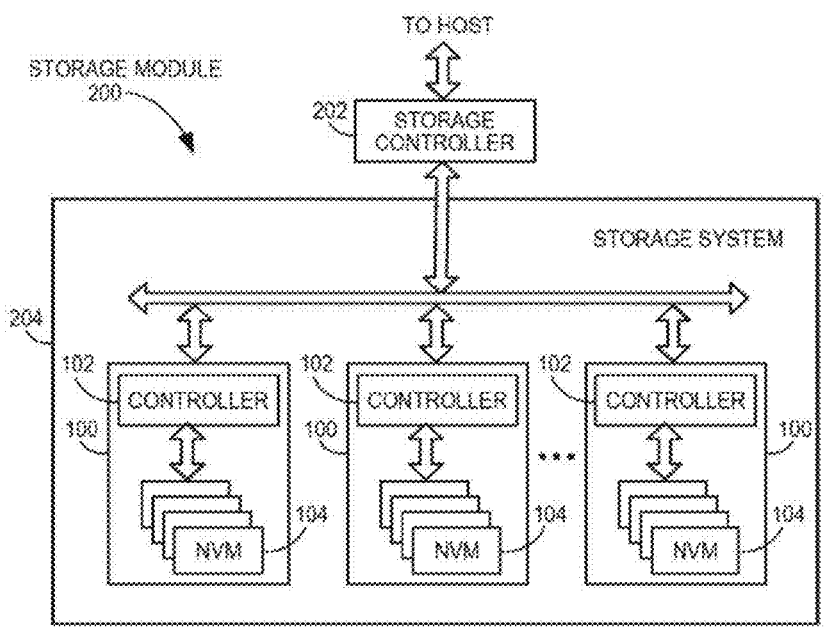
FIG. 1B is a block diagram illustrating an exemplary storage module.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
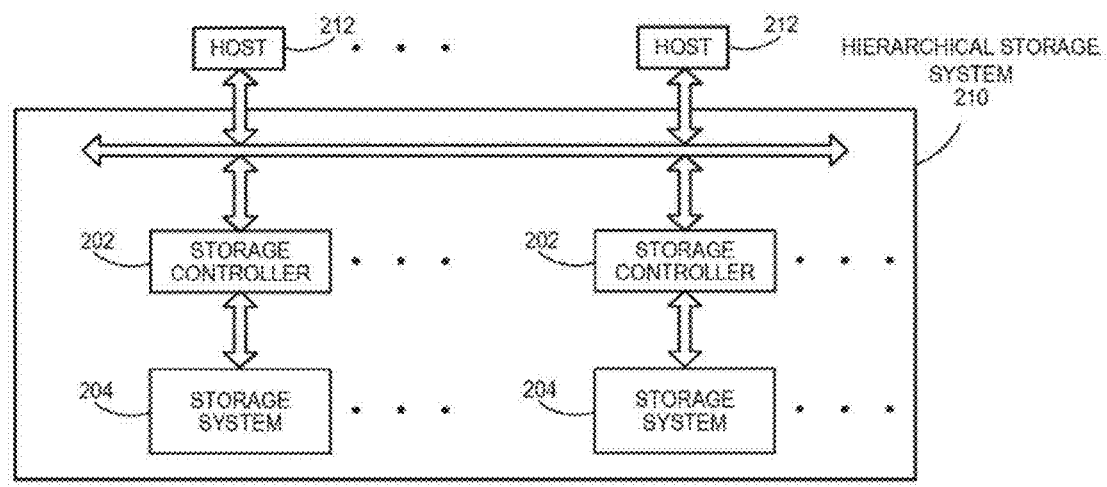
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
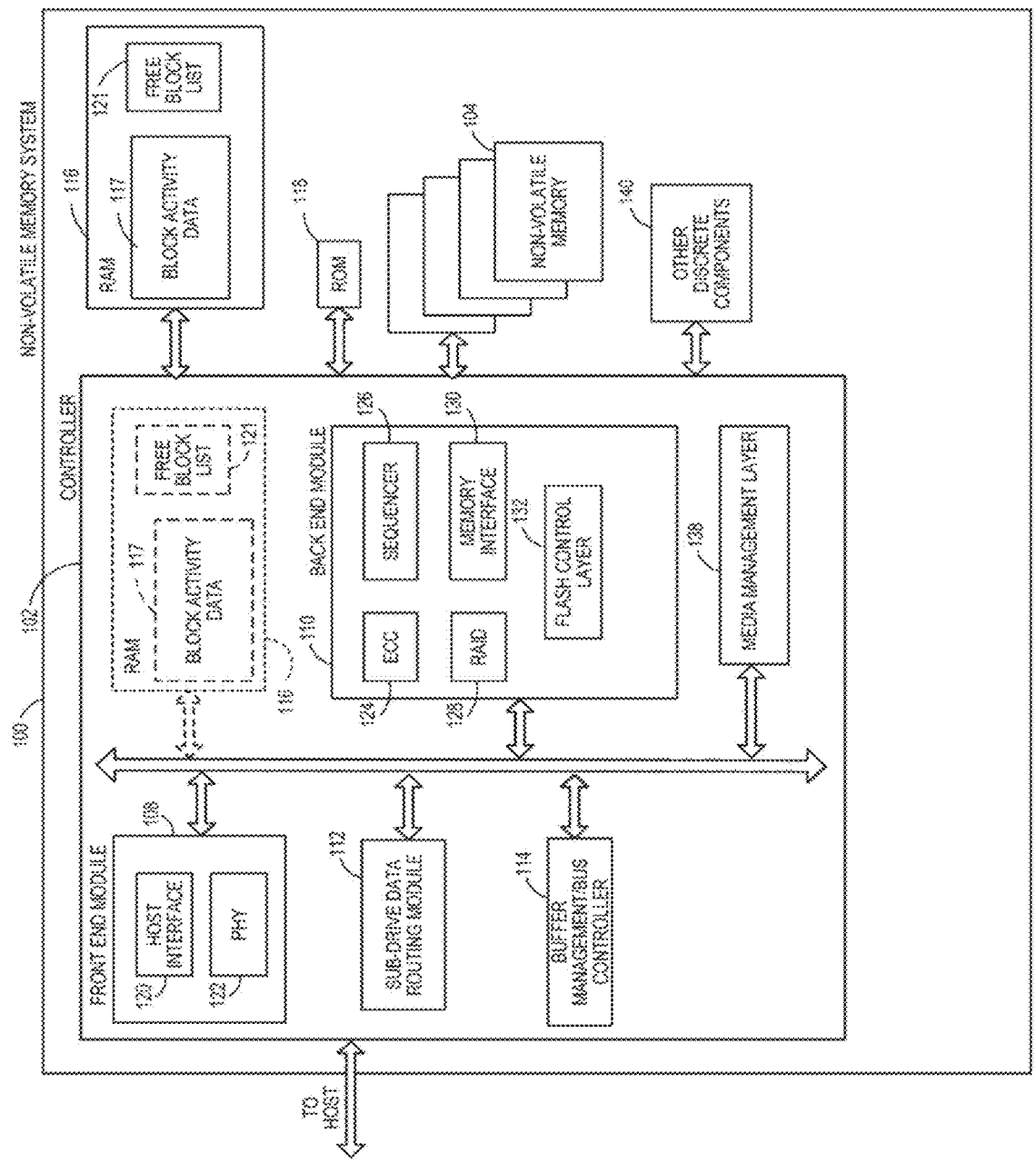
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a sub-drive data routing module 112 present on the die of the controller 102. As described below, the sub-drive data routing module 112 may provide functionality for routing data from a host only to a particular portion of non-volatile memory 104 and for moving data at predetermined times between various portions of the non-volatile memory 104 based on a frequency of host activity regarding the data. The sub-drive data routing module 112 of the controller 102 may accomplish this by tracking activity (e.g. the number of host writes or the number of host reads) to individual logical block addresses (LBAs) in predefined sections of contiguous LBAs, referred to herein as LBA blocks, in the logical address space. The sub-drive data routing module 112 may then assign an average activity count, also referred to herein as temperature, to all the LBAs included in that particular LBA block and, upon initiation of a garbage collection operation in a sub-drive, move data associated with a particular LBA to a physical block in the same or another sub-drive based on the temperature associated with that LBA. The sub-drive data routing module 112 may also manage sub-drives differently in the NVM system 100 such that only one sub-drive includes an open host write block, thus is the only sub-drive accepting host data from the host. Also, all other sub-drives, except for the single sub-drive that accepts host data, include open relocation blocks for accepting data relocated from a garbage collection operation. In other words, in one implementation all data from the host must always first go to the single sub-drive dedicated to receive host data and all other sub-drives only receive relocated data from each other or the single dedicated sub-drive (referred to herein as a staging sub-drive).

A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die.

The RAM 116 in the NVM system 100, whether outside the controller 102, inside the controller or present both outside and inside the controller 102, may contain a number of items, including a copy of one or more pieces of the logical-to-physical mapping tables for the NVM system 100. The RAM 116 may contain block activity data 117 that is used to track the temperature of data in the various sub-drives. The block activity data may be maintained at different levels of granularity, for example on a superblock level, in the form of individual LBA counters (or counters for the average temperature/activity for larger groups of LBAs) and so on. The RAM 116 may also include a free block list 121 indicating currently unused physical superblocks available for use in any of the sub-drives of the non-volatile memory 104.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the NVM system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
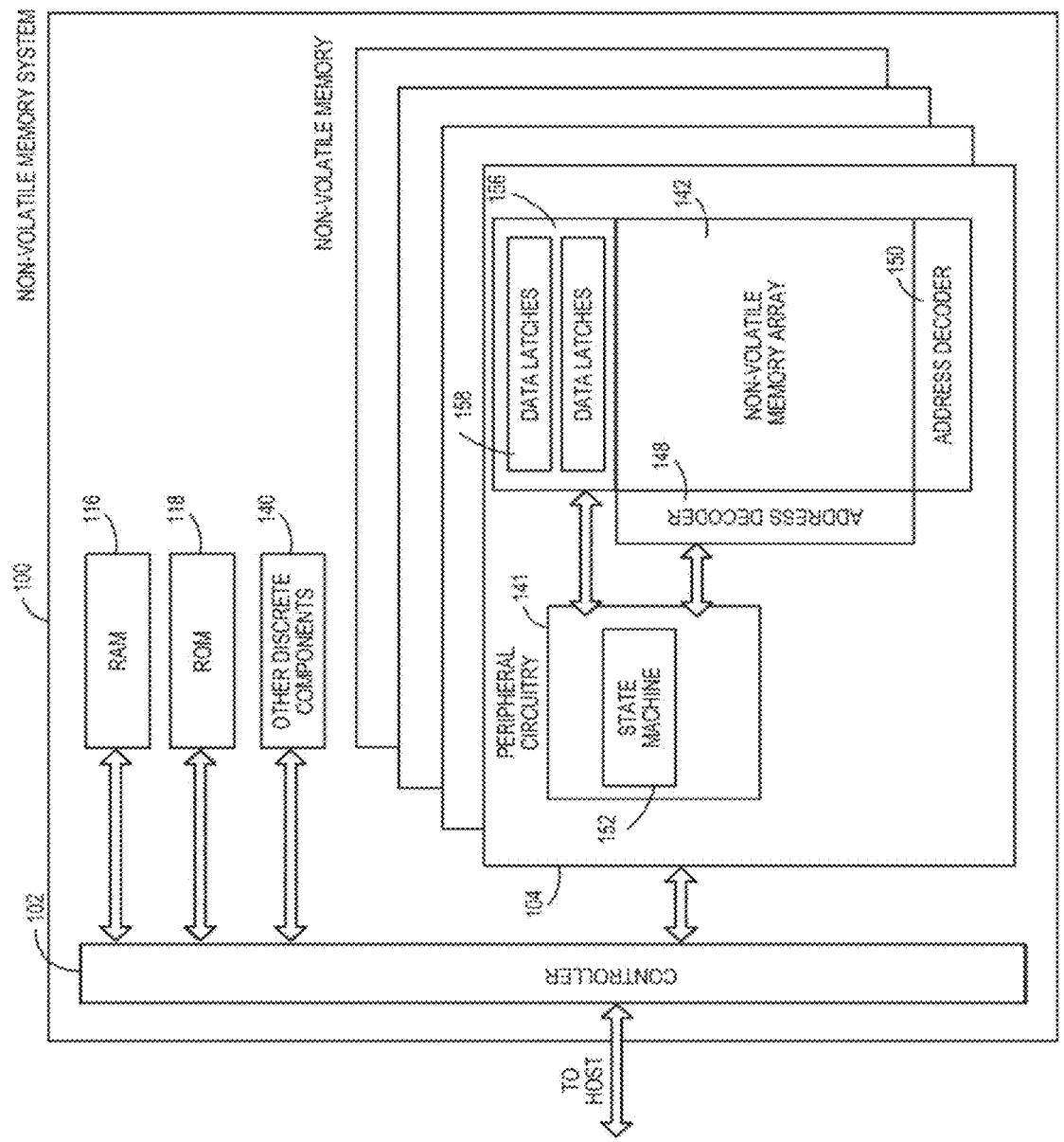
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and includes address decoders 148, 150. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
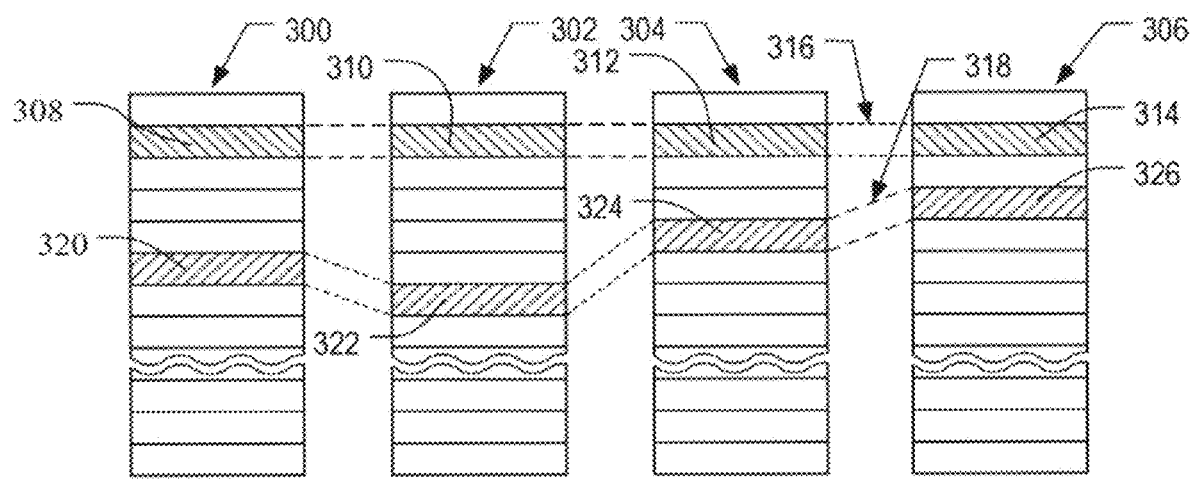
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
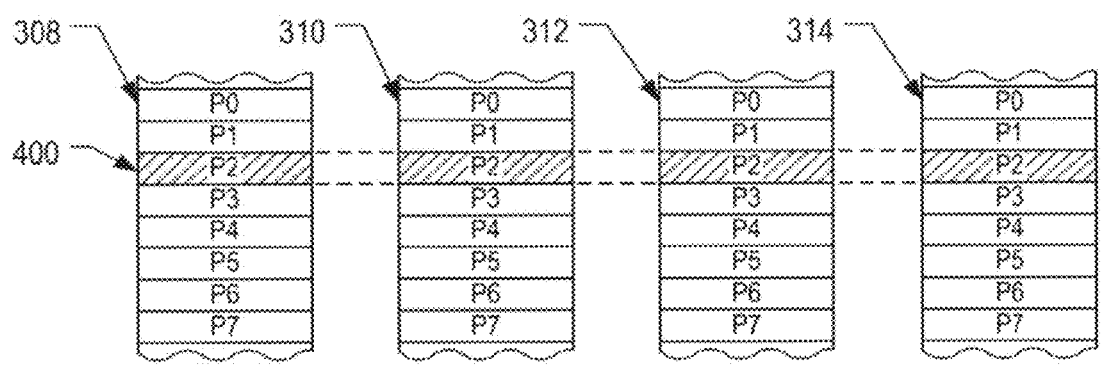
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

Figure 5:
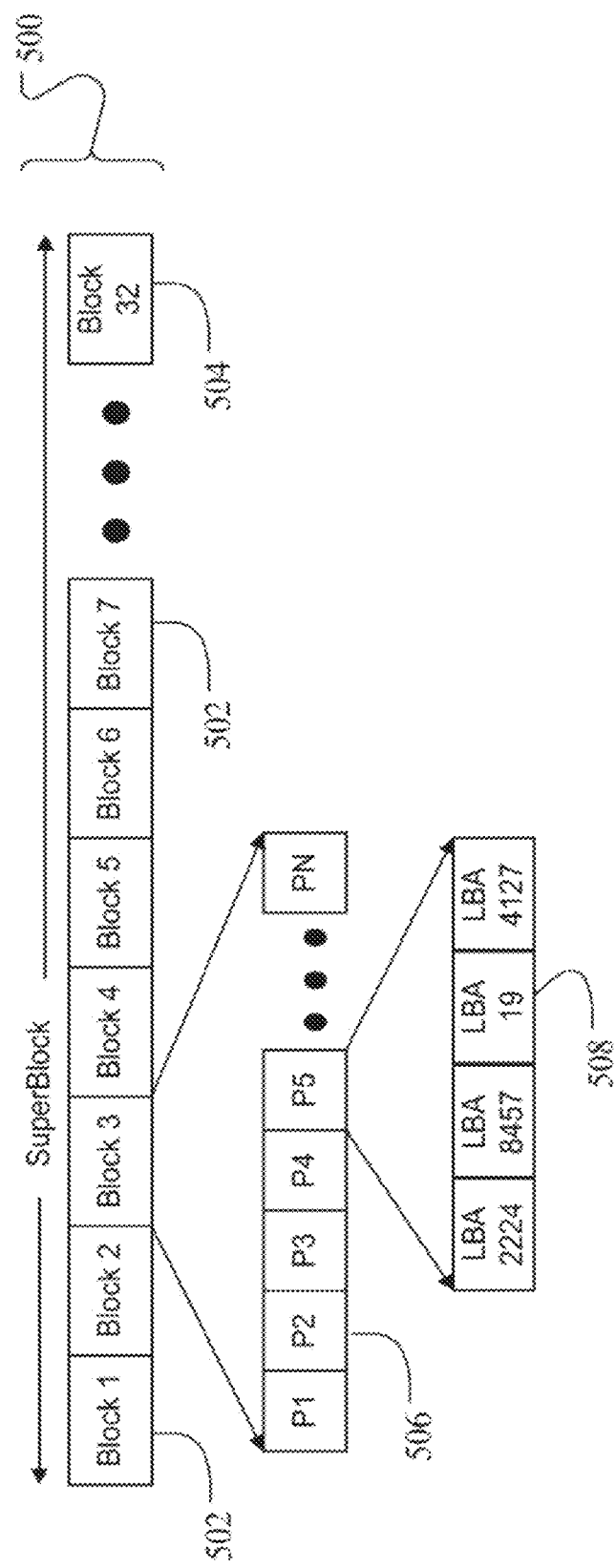
FIG. 5 illustrates is an example of a physical superblock of the non-volatile memory.

The term superblock may be used interchangeably with the term metablock herein. A superblock, as described in more detail below with reference to FIG. 5, is a metablock that assigns one of the constituent blocks to contain exclusively metadata regarding parity information for all of the remaining constituent blocks of the metablock. For example, each page of the designated parity block of a superblock may contain exclusive (XOR) data of the user data in a page of the remaining blocks of the superblock. The block in the superblock designated to contain parity data is typically the last block, but any block may be used in other implementations. Additionally, a superblock may span multiple dies, for example as many as 64 dies or higher.

Referring to FIG. 5, an example of a superblock 500 and its component parts is shown. As noted previously, a superblock 500 may be a fixed number of physical blocks 502 of data as well as one block 504 that contains exclusive or (XOR) data for every page of every other block 502 in the superblock 500. Each block 502 is comprised of a plurality of pages 506 that includes a plurality of pieces 508 of data. Each data piece 508 is an amount of data, for example a 4 Kbytes piece of data, that is associated with a logical block address (LBA). The LBAs shown in the example data pieces 508 of FIG. 5 are simply provided by way of example to show a situation where the data pieces 508 in a page 506 are associated with discontinuous LBAs.

Figure 6:
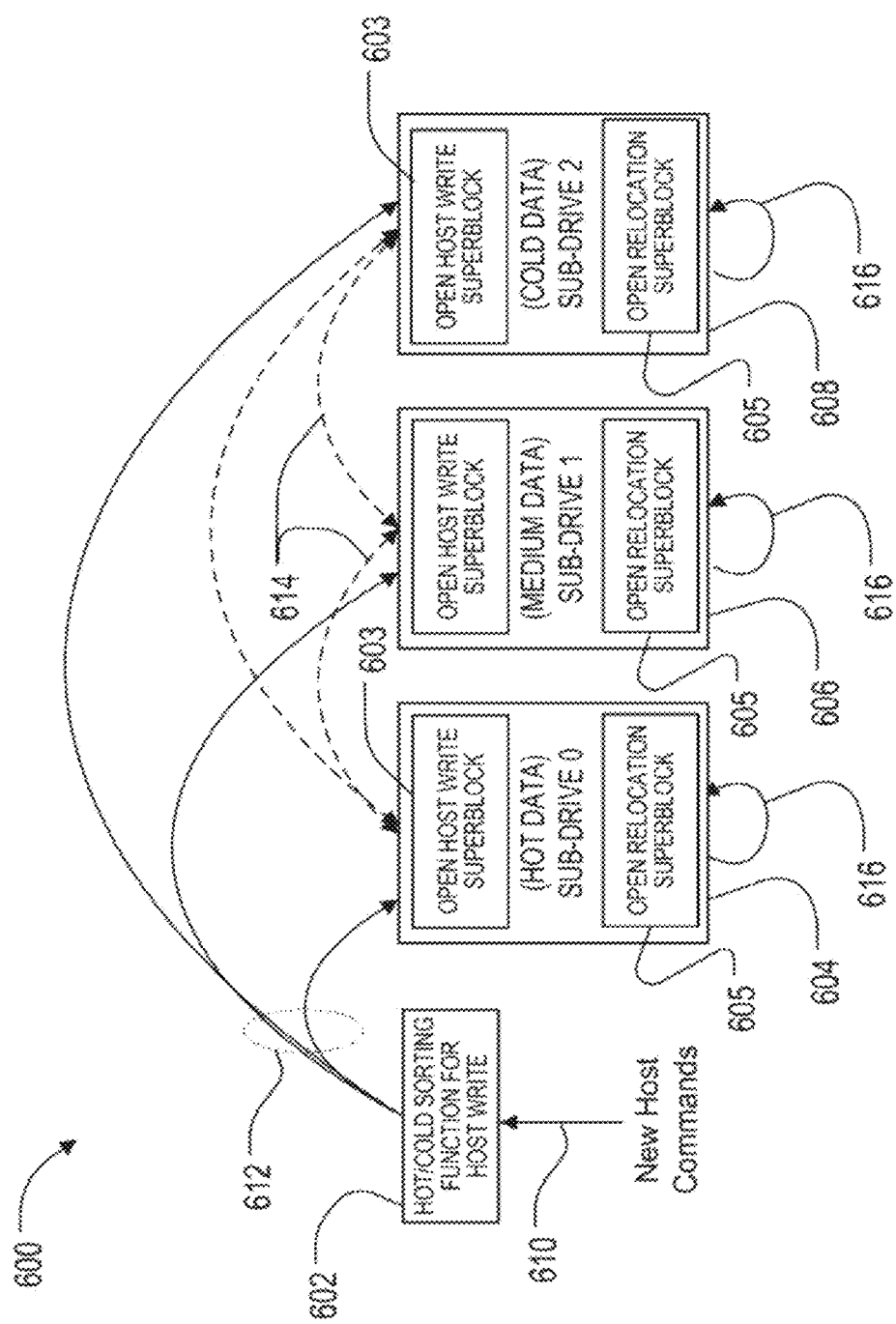
FIG. 6 is a block diagram of the non-volatile memory of FIG. 2A divided in to multiple sub-drives.

In FIG. 6, a conceptual illustration of the non-volatile memory 600 (corresponding to non-volatile memory 104 in FIGS. 2A-2B) is shown. The non-volatile memory 600 is divided into sub-drives for storing data, including sub-drives 604, 606, 608 configured to store data associated with LBAs determined to have particular "temperatures." As noted above, the temperatures relate to the frequency with which the data is written. Using a hot/cold sorting function 602 that may be part of the sub-drive data routing module 112, the controller 102 routes data from host commands 610 to a sub-drive.

As noted previously and described in greater detail below, the temperature of a given LBA refers to the frequency of host activity regarding the LBA associated with the data where, in one implementation, host activity refers only to host write operations. Although in other implementations the host read operations may also be considered as host activity, the discussion herein focuses on write activity as tracking and utilizing write activity may provide desired write amplification benefits. A simplified version of tracking data temperature is described herein, where temperature may be tracked on a superblock granularity basis such that all LBAs in a given superblock are given the same temperature. Other granularities of assigning and tracking temperature are also contemplated.

As shown in FIG. 6, data may be sorted into sub-drives each associated with a particular temperature threshold or range. The sub-drives 604, 606, 608 shown in FIG. 6 include a hot data sub-drive 604, a medium data sub-drive 606 and a cold data sub-drive 608, where the hot data sub-drive 604 is configured to contain only data associated with LBAs having a high frequency of host activity, the medium data sub-drive 606 is configured to store data associated with LBAs of an intermediate level of host activity that is less than that of the hot data sub-drive 604, and the cold data sub-drive 608 is configured it contain data associated with LBAs having infrequent host activity (less than the activity found in the intermediate data sub-drive 606). Although three sub-drives having data temperature associations are illustrated, any number of two or more sub-drives associated with respective temperature ranges are contemplated to allow for different granularity of data sorting by determined data temperature.

Each of the sub-drives 604, 606, 608 is a collection of superblocks that are managed together. Also, each of the sub-drives 604, 606, 608 may exist in separate non-volatile memory die 104, the same non-volatile memory die, or each straddle multiple non-volatile memory die 104 in the NVM system 100. Each sub-drive may include only one type of memory cell, such as SLC or MLC, or multiple types of memory cells.

The initial routing of data from the host to the sub-drives and between sub-drives is managed by the sub-drive data routing module 112 in the controller 102. With respect to initial host writes to a sub-drive, any of a number of hot/cold sorting functions 602 may be implemented. In one implementation, the sorting function 602 of the sub-drive data routing module 112 is configured such that all data coming from a host write into the non-volatile memory 600 is only sent initially to an open host write superblock 603 in the sub-drive that the LBAs of the incoming host write were last written to. If the superblock of incoming data for the host write includes updated data for LBAs that are currently in superblocks in different sub-drives, then the incoming superblock of host data may be written to the highest temperature sub-drive associated with the incoming LBAs. In another implementation, the sorting function 602 may cause the controller 102 to direct incoming host writes to a next hottest sub-drive. For example, if the LBAs in the superblock of the incoming host write data were previously associated with a superblock 500 in the cold sub-drive 608, the incoming host write would be directed to the intermediate sub-drive 606.

In other implementations of the hot/cold sorting algorithm 602, all incoming host write data may be written to a dedicated staging sub-drive (not shown) that is not associated with a temperature and from which the host write data may be remapped into one of the temperature-associated sub-drives 604, 606, 608. It is also contemplated that all incoming host data may initially be written to the hot sub-drive 604. In yet another implementation, the hot/cold sorting function 602 for incoming host writes may simply use a round robin technique that takes turns directing sequential superblock host writes to a different sub-drive 604, 606, 608 each time. As discussed in greater detail herein, another initial host superblock write routing technique is contemplated, which looks at recent write density of the LBAs in the superblock, that may react more quickly to changes in the write activity associated with LBAs stored in a particular superblock. Any of a number of other initial host write routing algorithms are also contemplated.

In one implementation, after data is routed to a desired sub-drive during the initial host write, valid data from a selected source superblock is only re-written during a garbage collection operation to an open relocation superblock 605 into the same sub-drive as the source superblock for that valid data.

Data flow possibilities into and between the sub-drives 604, 606, 608 of the non-volatile memory 600 are shown in FIG. 6 for one implementation. Host data writes 610 handled via the hot/cold sorting function 602 of the sub-drive data routing module 112 are shown in solid lines, as are the garbage collection operations where valid data is only written to the same source sub-drive during garbage collection. The initial host write paths 612 and the garbage collection paths 616 are shown as solid lines because they represent actual data movement to new physical locations. The various host data write paths 612 illustrated may change depending on the particular hot/cold sorting function version used, as described above.

In contrast to the solid lines of initial host write paths 612 and garbage collection paths 616, possible re-mapping paths 614 of superblocks from one sub-drive to another are shown as dotted lines. The re-mapping of superblocks between sub-drives is accomplished logically, separately from any garbage collection activity, such that no data is rewritten to different physical locations. This allows the NVM system 100 to use separate criteria for re-mapping superblocks to a different temperature sub-drive and for selecting a source block for garbage collection. For example, if temperature sorting was combined with garbage collection then the sorting may be slowed down by the fact that the coldest block in a higher temperature sub-drive that may need to be demoted from that higher temperature sub-drive to a colder temperature sub-drive, may not be the same block that is most efficient for purposes of garbage collection from the sub-drive. So, if the superblock with the least amount of valid data (typically selected for a garbage collection operation) does not coincide with the coldest superblock in that sub-drive, then the hot/cold data sorting by garbage collection may be less accurate. The re-mapping of superblocks may be triggered by one of the sub-drives overflowing its allotted logical address space and the controller 102 may select a coldest block for re-mapping to the next colder sub-drive (or hottest block for re-mapping to the next hotter drive, for example if the cold sub-drive 608 is too full) and re-map that superblock into the other sub-drive.

Figure 7:
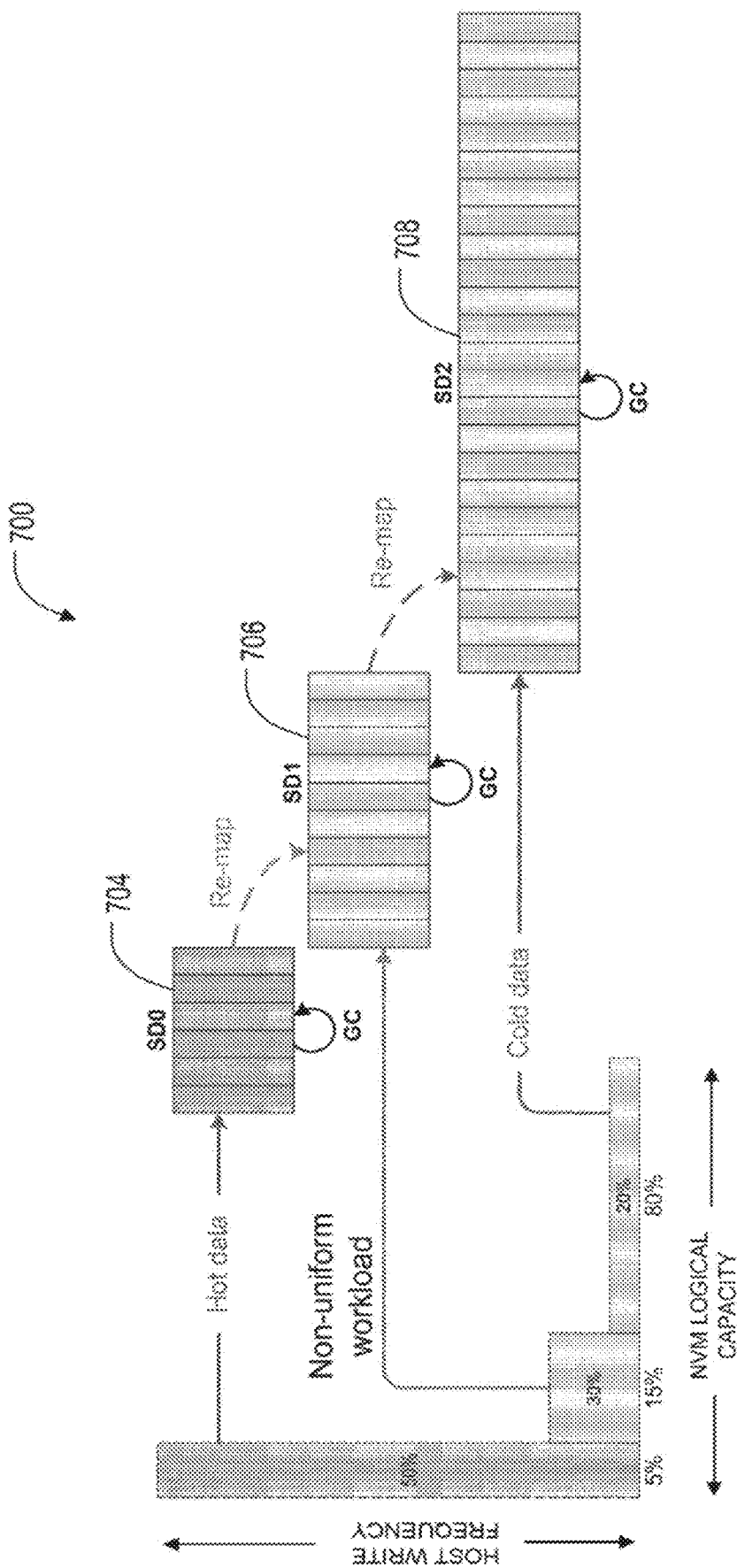
FIG. 7 is a block diagram of the sub-drives of FIG. 6 arranged with a particular logical space and workload distribution.

Referring to FIG. 7, a version of a non-volatile memory 700 corresponding to the non-volatile memory 600 of FIG. 6 is shown with a predetermined logical space capacity assigned to each sub-drive (in this example, 5% for the hot sub-drive 704, 15% for the intermediate sub-drive 706 and 80% of the logical address space allocated to the cold sub-drive 708). The predetermined logical space refers to a percentage amount of the total address space of the NVM system 100 and not to any specific LBAs or LBA ranges in that address space. Accordingly, a re-mapping trigger for remapping one or more superblocks to a different sub-drive may be based on a sub-drive receiving data in a host write that pushes the total logical address space contained in the sub-drive above the respective predetermined amount of the address space allotted to that sub-drive. Other fixed percentages of logical space allocation besides the 5%/15%/80% example provided may be implemented. The amount of logical space allocation for the sub-drives may be variable in other implementations, where there may be an algorithm implemented in the controller 102 for providing a dynamic amount of logical space in the sub-drives based on work load or other factors that may affect the re-mapping of super-blocks. For simplicity, it is assumed in the example of FIG. 7 that the amount of logical space allocated to each sub-drive is some fixed amount.

Also illustrated in FIG. 7 is a hypothetical non-uniform workload of incoming host writes where the hot, intermediate and cold sub-drives 704, 706, 708 are each receiving a different percentage (in this example, 50%, 30% and 20% respectively) of the total host writes. It is generally expected that the workload for each sub-drive will vary, particularly when looking at the distribution of host write activity among the sub-drives over shorter snapshots of time. The controller 102 may track the number of host writes of LBAs in each superblock 500 in a sub-drive over time.

The boundaries of the temperature ranges assigned to the sub-drives, such as the hot, medium and cold sub-drives in the examples of FIG. 6, may be set to predetermined values at the time of manufacture or the controller 102 may use an adaptive algorithm to search for optimized temperature ranges to assign to each sub-drive 604, 606, 608 based on observed data temperature distributions. When a re-mapping of a superblock to a different sub-drive is necessitated by a sub-drive overflowing its predetermined amount of the NVM system's 100 logical address space, then the coldest superblock may be selected from the sub-drive and re-mapped logically to the next colder sub-drive. In other implementations, in situations where the sub-drive that is overflowing its predetermined logical amount of space is the coldest sub-drive the hottest superblock may be selected and logically re-mapped into the next hotter sub-drive.

Figure 8A:
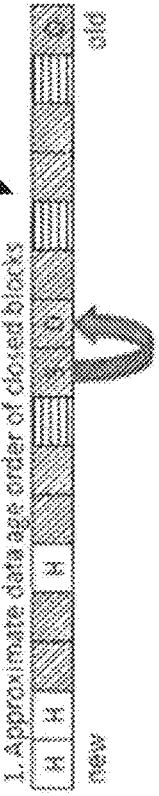
FIGS. 8A and 8B illustrate different data age tracking lists for tracking the temperature of super-blocks.
Figure 8B:
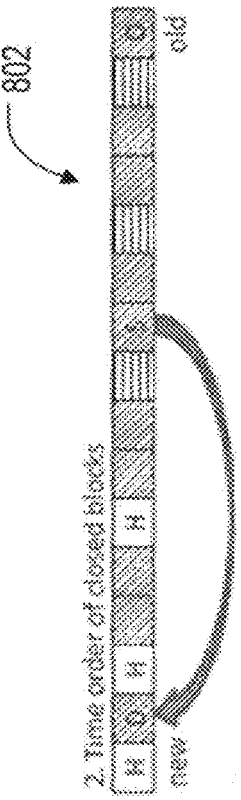
Figure 8C:
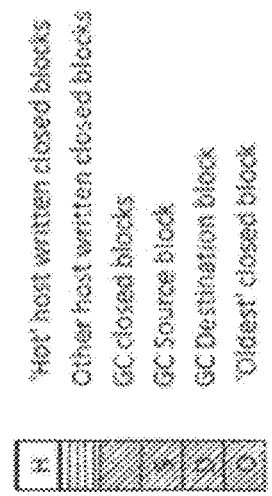
FIG. 8C is a legend of different entry types in the tracking lists of FIGS. 8A and 8B.

Any of a number of different data temperature tracking mechanisms may be used to monitor the temperature of data written into the sub-drives of the NVM system 100. Two different data temperature tracking mechanisms that track data temperature at the superblock level are illustrated in FIGS. 8A-8C. FIG. 8A shows a sample data temperature tracking mechanism where the time that a superblock is first closed (completely written) from a host write operation is tracked in an ordered list 800. Superblock order in the list 800 would then approximately correspond to the order data was written by the host, with the most recent host written superblock being identified in the left-most entry of the list 800 and the oldest superblock being represented by the last superblock entry on the opposite end of the list in FIG. 8A. In the data age tracking version of FIG. 8A, any garbage collection destination superblock (D) would inherit the position of the last source block (S) from which valid data was copied. Thus, because valid data from several source superblocks in a sub-drive is typically needed to fill up the destination superblock D in that same sub-drive, the destination superblock D would inherit the position in the list 800 of the last source superblock S copied from and the positions of the earlier source superblocks for that destination superblock would not be taken into account.

FIG. 8B illustrates a data age list 802 for a slightly different version of a data age tracking mechanism. In the version of FIG. 8B, each entry tracks the order of closing of superblocks without maintaining a connection to just host write operations as described in FIG. 8A. Instead, the method of FIG. 8B is a simplified method that simply looks at the time any block was closed and puts the most recently closed superblock at the beginning (here, the left side) of the list 802 regardless of whether it was a host write or a garbage collection write. When a destination superblock D is closed in this version, it will look new data and be placed at the beginning of the list. The version of FIG. 8B may lead to cold data taking a longer time to reach the older (and thus colder) end of the list. The data age list versions of FIGS. 8A and 8B are generated for each sub-drive separately. FIG. 8C shows a legend explaining the list entry types for the lists 800, 802 of FIGS. 8A and 8B.

In one implementation, the controller 102, via the sub-drive data routing module 112, keeps track of all host write transactions for every LBA in every superblock for the life of the NVM system 100. The sub-drive data routing module 112 may store this information in the block activity data 117 maintained in RAM 116. Thus, the predetermined amount of time within which the number of host writes to an LBA are tracked may be the entire life of the NVM system 100 and a workload for the sub-drives may be based on the percentage of the total host writes to LBAs in each particular sub-drive. In other implementations, in order to provide a more useful indication of changes in host write density to LBAs and the associated sub-drives containing those LBAs, the predetermined amount of time may refer to a fixed-size window of time that extends back a limited amount of time to the present, wherein only the most recent host writes are included in the workload calculation and earlier LBA hits are removed from the respective counters.

Figure 9A:
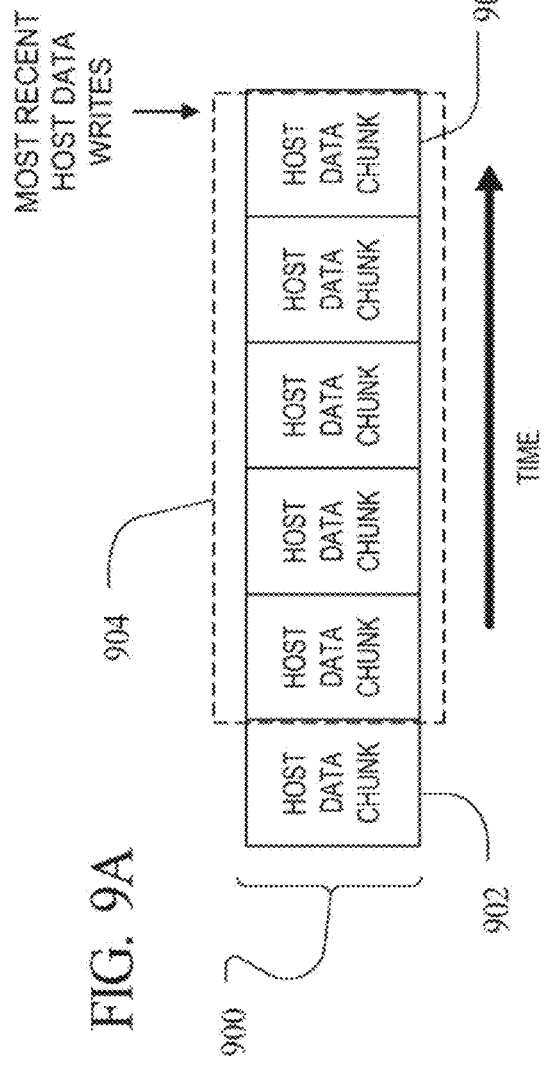
FIGS. 9A and 9B illustrate a monitoring window of most recently received host data that is used to determine current temperature of logical addresses in the non-volatile memory system.
Figure 9B:
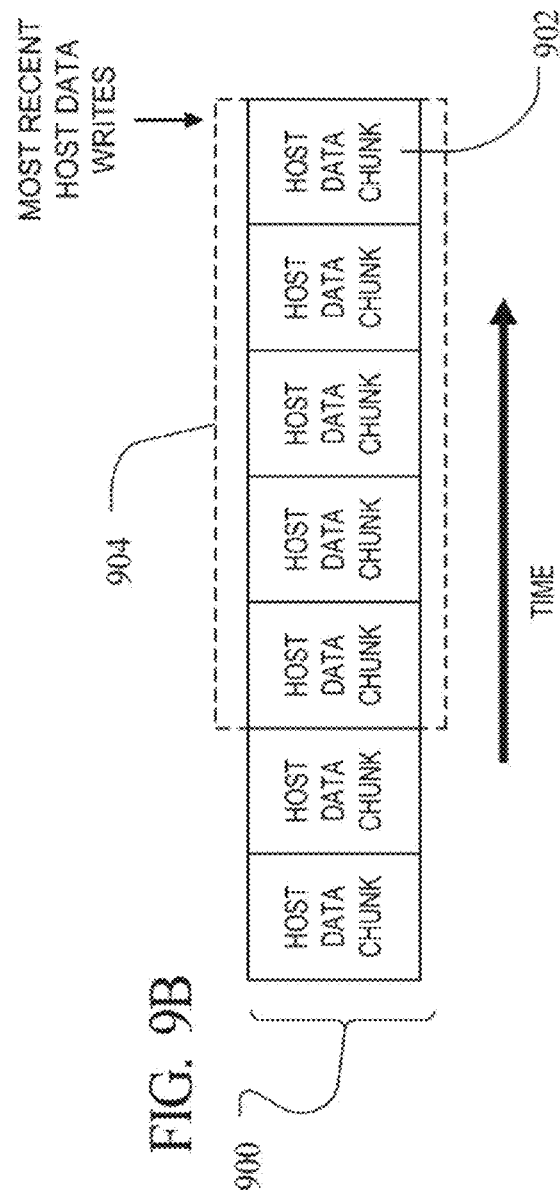

A visual representation of this sliding window of time within which the host write activity at LBAs is shown in FIGS. 9A and 9B. In FIG. 9A, the incoming host data stream 900 is represented as predetermined amounts of host data, shown as host data chunks 902, that are accumulated over time. The host data chunk size may be a fixed and constant amount in one implementation, for example the host data chunk size may be in the increment of a superblock 500. The controller 102 may look only at the LBA hit rate (in terms of density, or hit rate per LBA) in a sliding window 904 of time, where the time may be represented by the number of consecutive host data chunks 902 from the most recent to a predetermined number of host data chunks prior in time. Within this window 904, all of the host transactions for LBAs are tallied and the sub-drives noted within which data associated with the LBAs currently reside, and a percentage workload of the amount of LBA hits in the time window for a particular sub-drive may be determined. As shown in FIG. 9B, when a next host data chunk 902 has been accumulated, the window 904 slides to include the latest host data chunk 902 and the oldest host data chunk 902 previously in the window is removed, representing that the LBA transaction counts associated with that now excluded host data chunk 902 are subtracted from the respective workload calculation. In this manner, the current workload of LBAs in the various sub-drives may more accurately be reflected and older activity at LBAs is removed. The above technique and system for tracking and updating (host write activity) for LBA blocks is just one example and other LBA write density and sub-drive workload tracking and update methods are contemplated.

Figure 10:
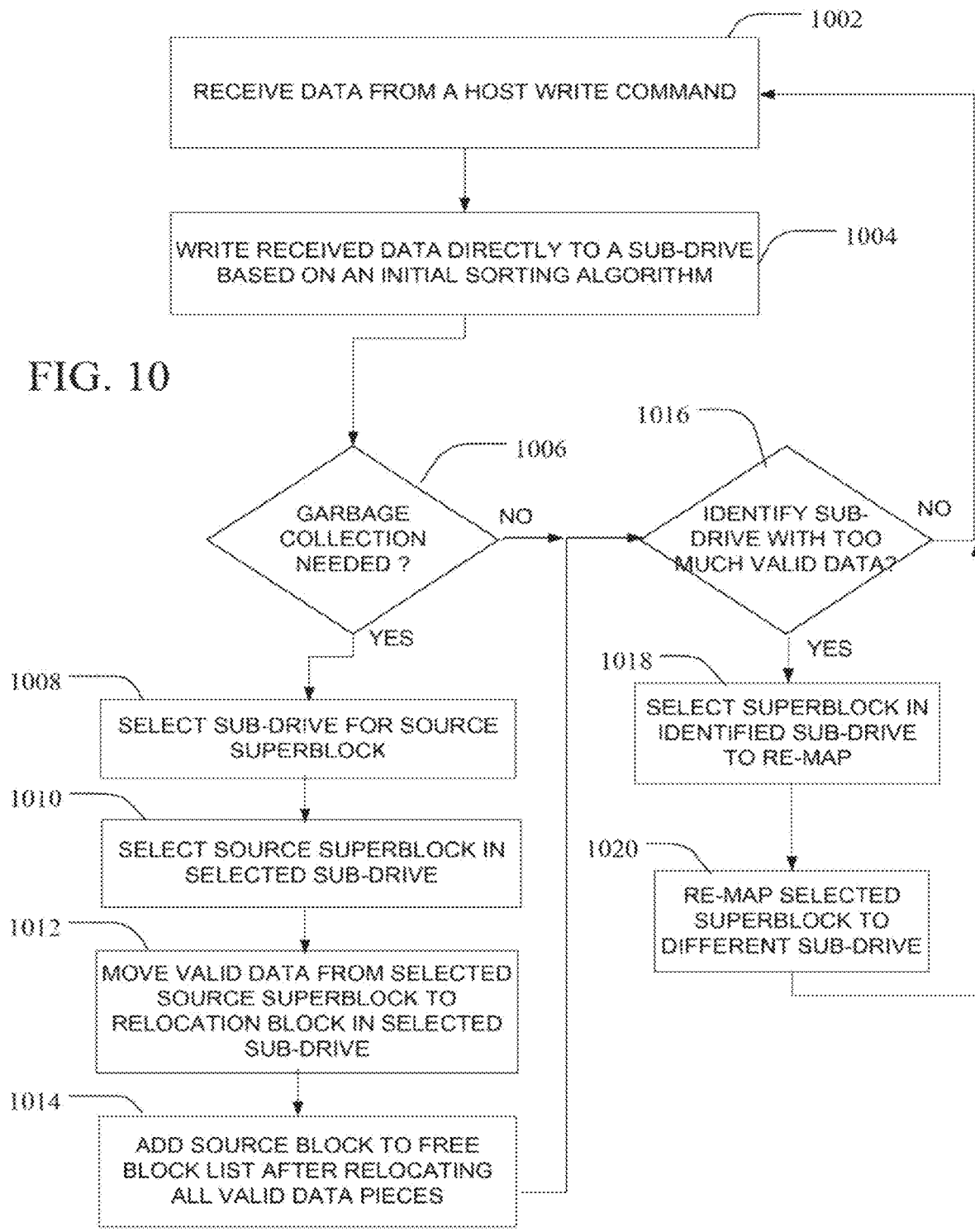
FIG. 10 is a flow diagram illustrating one implementation of managing data flow in a non-volatile memory such as shown in FIGS. 6-7.

A method of utilizing the NVM system 100 with sub-drives and data structures described above is illustrated in FIG. 10. Referring to FIG. 10, a flow chart describing an implementation of the data flow in sub-drives 604, 606, 608 the non-volatile memory 600 is described. Data is received at the NVM system 100 associated with a host write command (at 1002). The sub-drive data routing module 112 of the controller 102 may use an incoming hot/cold sort function 602 to initially direct the host write to a desired sub-drive (at 1002). As noted above, the technique for the initial host write sort may be any of a number of existing techniques, including always writing the incoming data into a hottest sub-drive, always writing incoming data into a next hotter sub-drive than a current sub-drive containing the LBA now being overwritten and so on.

Periodically, for example after every host write to the NVM system 100, the controller 102 may determine whether a garbage collection operation is needed for any of the sub-drives (at 1006). One suitable garbage collection trigger may be the number of free blocks in the free block pool shared by the sub-drives in the non-volatile memory 104 falling below a predetermined minimum value. If the controller 102 detects that too few free blocks are available based on the free block list 121, then a garbage collection operation may be initiated. The number of free blocks is just one example of a garbage collection trigger and different or additional garbage collection triggers are contemplated.

Once triggered, the sub-drive in the non-volatile memory 104 is selected from which a source superblock will be garbage collected (at 1008). One sub-drive selection process, based on selecting the sub-drive that currently has an amount of over-provisioning (OP) that is the most over its calculated targeted OP amount, is described in greater detail below. Once the sub-drive is selected, the a source superblock is selected from that sub-drive (1010), for example the superblock 500 having the least amount of valid data. Valid data from the selected source superblock is then copied to a destination (relocation) superblock in the same sub-drive (at 1012). As noted previously, the valid data copied from a source superblock is only copied into another superblock in the same sub-drive and no data crosses sub-drive boundaries during garbage collection. The sorting of previously written data from one sub-drive to a different sub-drive based on data temperature happens separately in a logical re-mapping process described below. After all valid data pieces from the selected source superblock 500 have been relocated, then the selected source superblock may be added to the free block list 121 maintained in RAM 116 (at 1014). Superblocks 500 in the free block list 121 may be later used in any of the sub-drives as needed.

Referring again to FIG. 10, if garbage collection is not needed after a particular host write (at 1006), or if garbage collection is performed as described above, the sub-drive data routing module 112 also determines whether a logical re-mapping of a superblock is needed. For example, the sub-drive data routing module may determine if a sub-drive is too full because it now contains more valid data than its predetermined amount of logical address space the logical address space size that it was assigned (at 1016). If no sub-drive has overflowed its predetermined portion of the NVM system 100 logical address space, then the process of receiving and processing host write data may continue (at 1016, 1002). If a sub-drive has overflowed its predetermined amount of logical address space, then a superblock in that identified sub-drive is logically re-mapped to a different sub-drive to re-balance the logical space distribution (at 1018, 1020).

In one implementation, the superblock selected for logical re-mapping from the sub-drive identified as being over its allotted logical address amount may be the coldest superblock in that sub-drive and may be re-mapped to the next coldest sub-drive as illustrated in FIG. 7. In other implementations, the superblock selected for remapping to a different sub-drive due to logical address space overflow in a particular sub-drive may be the hottest block and the sub-drive to which that superblock is remapped may then be the next hotter sub-drive (e.g. from SD2 to SD1 in FIG. 7). The coldest (or hottest) superblock in a sub-drive may be selected according to any method being used to track the temperature of data in the sub-drives, such as the closed block age lists (800, 802) of the different superblock age tracking methods described above with respect to FIG. 8A or 8B.

Referring again to the garbage collection decision path of FIG. 10, and the step of selecting a sub-drive from which to garbage collect a superblock, the decision as to which particular sub-drive 604, 606, 608 requires a garbage collection operation may be based on target over-provisioning thresholds for each of the different sub-drives. Overprovisioning, as used herein, refers to the amount of physical space in non-volatile memory greater than the amount of logical address space. The total amount of overprovisioning for the entire non-volatile memory 104 may be preset at manufacture and, based on current host access density (also referred to herein as data temperature), such as write activity, may be distributed among the sub-drives as respective target overprovisioning thresholds.

The target overprovisioning thresholds for each sub-drive in the non-volatile memory, as described in greater detail below, are determined based on the current logical capacity occupied by valid data in each sub-drive and the current write traffic (also referred to herein as workload) in each sub-drive. The NVM system 100, through these variable target overprovisioning settings, takes advantage of the pattern of data movement between sub-drives driven by the data temperature boundaries assigned the sub-drives to help avoid write amplification for "hotter" (higher update frequency) data. For example, the NVM system 100 may be configured at manufacture to include a predetermined amount of minimum physical capacity overprovisioning for the system as a whole and then divide up the logical capacity as desired among the sub-drives where a sub-drive associated with a data type having a higher likelihood of update is allocated a larger capacity overprovisioning than a sub-drive associated with a data type having a lower frequency of update.

As noted above, the non-volatile memory 104 of the NVM system 100, as a whole, may be manufactured with an overprovisioning amount such that there is a predetermined extra physical capacity (e.g., extra physical superblocks) greater than the predetermined total logical capacity. Each sub-drive in the NVM system 100 possesses a variable portion of the NVM system's logical capacity based on the historical flow of data into each sub-drive based on predetermined. Also, for a given window of time, such as window 904 (FIG. 9) that is based on a most recent set of data chunks 902 received, a percentage workload (W) may be determined for each sub-drive. The workload is a measurement of host access density to LBAs (e.g. the host write activity directed to LBAs) in the sub-drives. In one implementation, workload may be defined as the total number of hits (e.g. write operations) at each LBA in a sub-drive over a designated window time period and the percentage workload for a sub-drive is that total number of hits divided by all hits at any LBA in the whole NVM system during the window 904.

Based on the current logical capacity, current workload and the total overprovisioning of the entire NVM system, the controller 102 via the sub-drive routing module 112 can then calculate a target over-provisioning to optimize the physical overcapacity for each sub-drive. Finally, by selecting a superblock for garbage collection from a sub-drive that currently is above its respective calculated target overprovisioning amount, the overprovisioning can be adjusted. Thus, the overprovisioning of each sub-drive may be determined based on the workflow (i.e., access density in terms of the number of host writes) and selection of a superblock for a garbage collection operation may be made based on the relative overprovisioning status of each sub-drive.

Figure 11:
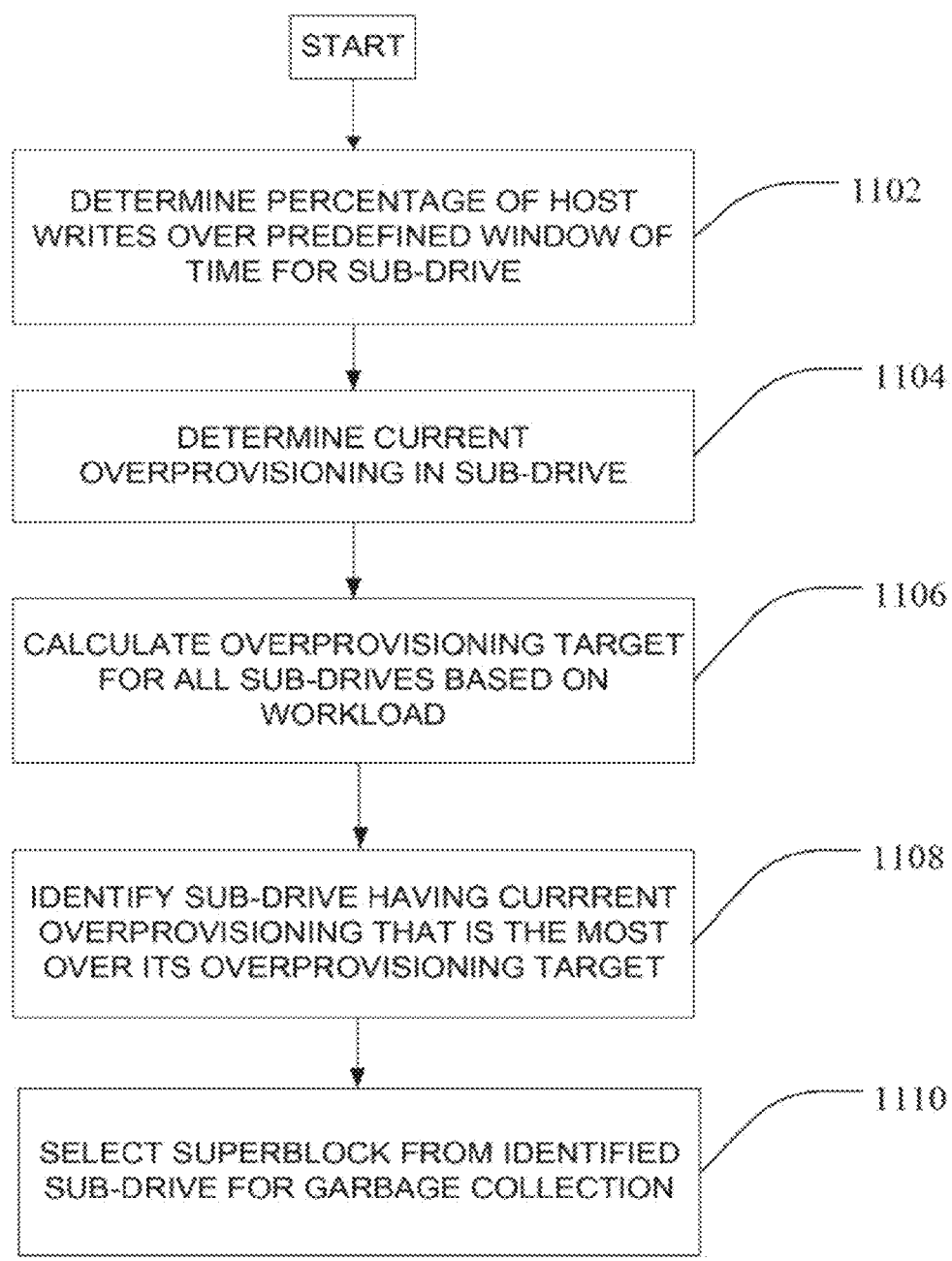
FIG. 11 is a flow diagram illustrating a process for determining the sub-drive in the non-volatile memory from which to select a source block for garbage collection and for then re-mapping valid superblocks between sub-drives independently of a garbage collection operation.

FIG. 11 illustrates a process for selecting a source superblock for a garbage collection operation after a garbage collection trigger has been detected. The current workload for each sub-drive is calculated over the predefined window 904 by the controller 102 (at 1102). The sub-drive data routing module may then determine the actual amount of overprovisioning already present in each sub-drive (at 1104), for example by looking at the amount of physical space already associated with each sub-drive relative to the amount of valid data present in the sub-drive. A target over-provisioning desired for each sub-drive may be calculated based on that determined workload in each sub-drive (at 1106). Once the target overprovisioning is calculated from the workload, the sub-drive data routing module may then identify the sub-drive having a current over-provisioning level that is the greatest amount over its calculated target OP level (at 1108). A superblock is then selected from that identified sub-drive for garbage collection (at 1110). The criteria for superblock selection may be any of a number of criteria, such as the superblock with the least amount of valid data, the most recently written superblock, or other criteria.

Any of a number of target overprovisioning formulas and techniques may be used to determine target overprovisioning for each sub-drive.

One suitable algorithm may be:

$$\theta_i = \sqrt{\frac{\alpha_i \cdot v_i}{\left[\sum_i \sqrt{\alpha_i \cdot v_i}\right]^2}}$$

where $\theta_i$ is the fraction (0 to 1) of target OP that should be applied to sub-drive i; $\alpha_i$ is the fraction (0 to 1) of total NVM system valid logical space in sub-drive i; and $v_i$ is the fraction (0 to 1) of total host write workload W attributed to sub-drive i. In the examples of FIGS. 6-7, the number of sub-drives is 3 and so i=3. The host write workload W distribution may be calculated over some sliding window of time as discussed above. Any of a number of different approaches and formulas for determining the target OP may be used. Additional details on known forms of target OP calculations may be found in, for example, U.S. Pat. No. 9,021,231, the entirety of which is hereby incorporated herein by reference.

Figure 15:
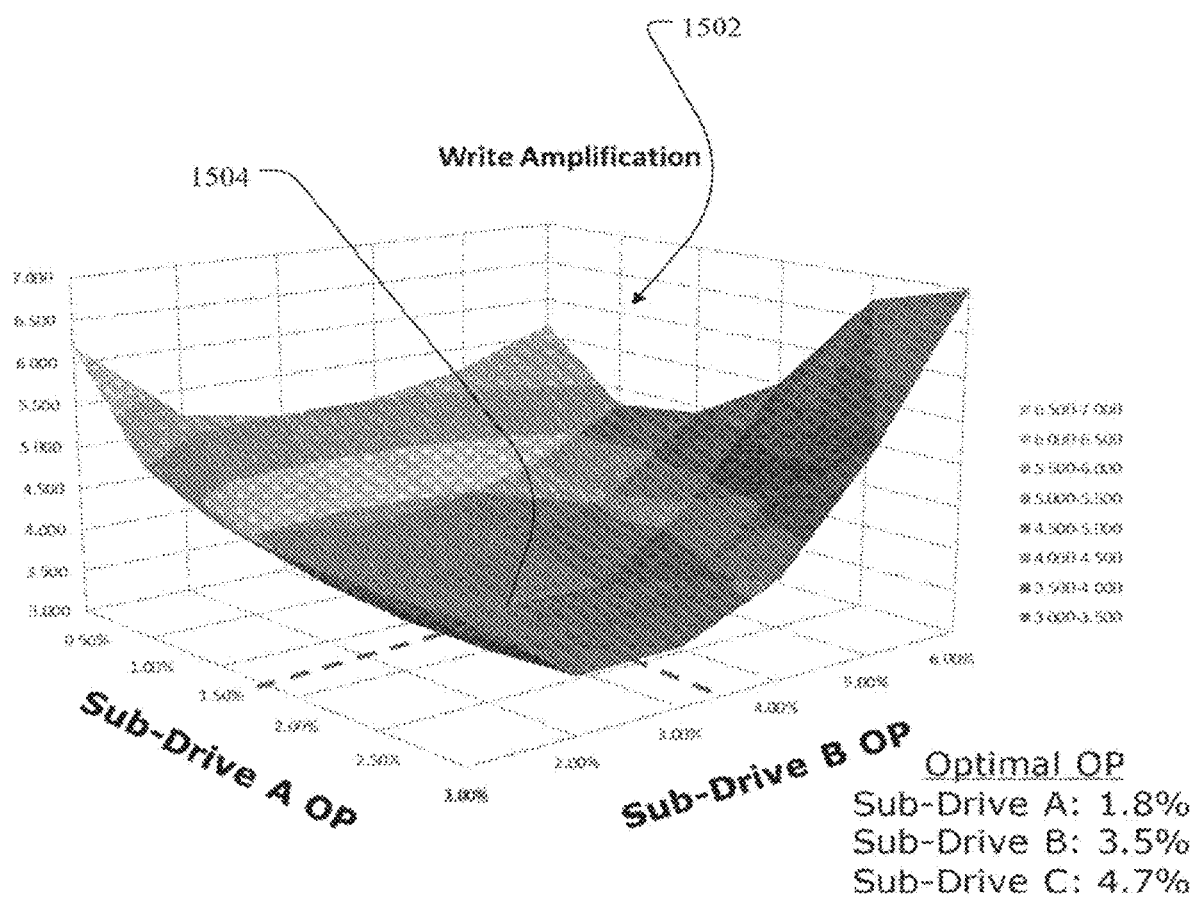
FIG. 15 illustrates an example write amplification surface usable to determine an optimal write amplification point with which to set relative target overprovisioning levels in multiple sub-drives.

Additionally, a somewhat cruder, more iterative "hit or miss" method of determining desired overprovisioning for each of the sub-drives may be implemented based on an analysis of a write amplification surface generated for the NVM system. An example of a standard write amplification algorithm is $$WriteAmplification = \sum_{k=0}^{n} GroupHitRate(SD_k) WriteAmp(OP_{SD_k})$$

where a write amplification surface may be generated as the iterative sum of each of k sub-drives (SD) group hit rate multiplied by the write amplification for that sub-drive at a given overprovisioning level WriteAmp($OP_{SD_k}$). One such write amplification surface 1502 calculated using the standard write amplification algorithm above is provided in FIG. 15, where different target overprovisioning levels for one sub-drive may be iterated to determine overprovisioning levels for the other sub-drives that hit or closely approach the theoretical minimum 1504 of the write amplification surface 1502. The theoretical minimum 1504 is the optimum write amplification point. In the example of FIG. 15, assuming a 10% total net overprovisioning for the entire memory system and a predetermined workload, the optimal write amplification point may be 1.8% of the overprovisioning (OP) allocated to sub-drive A, 3.5% allocated to sub-drive B, and 4.7% allocated to sub-drive C.

Initial Host Write With Hot Host List

Figure 12:
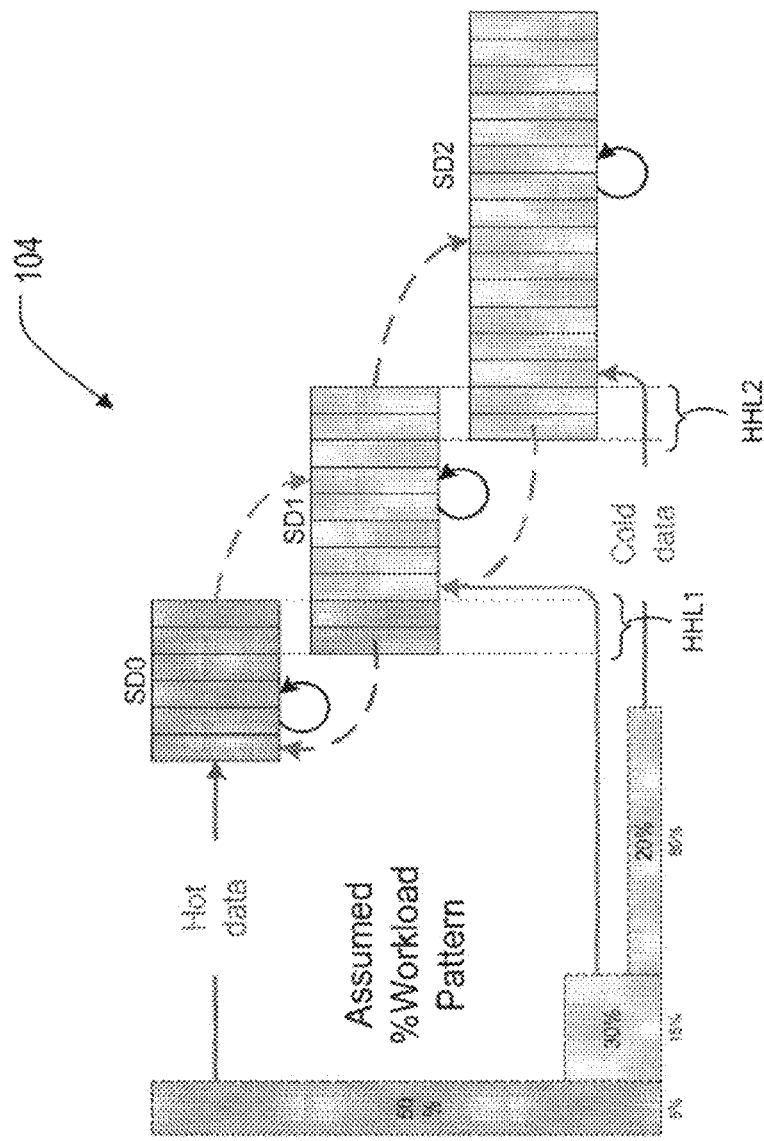
FIG. 12 illustrates an alternative embodiment for initial host write data sorting in the non-volatile memory of FIGS. 6-7.

A method of sorting initially written host data to a desired sub-drive based on data temperature is illustrated in FIG. 12. The method may be executed in a system such as illustrated in FIGS. 6-7 and utilized in an overall data management flow at step 1004 of FIG. 10. To implement this particular host write sort method, the hot/cold sorting function 602 of the sub-drive routing module 112 may look at recent host write density to react to changing host write workload patterns and reduce write amplification through better initial assignment of data to an appropriate sub-drive during a host write.

The method includes keeping a separate first in first out (FIFO) recent write list of superblocks for each sub-drive other than the hottest sub-drive. Referring to the three sub-drive non-volatile memory 104 version of FIG. 12, the controller 102 maintains a hot host list for the intermediate temperature sub-drive and for the cold sub-drive. The hot host lists may be maintained as separate lists in RAM 116. The hot host lists (HHL1 and HHL2) may each have a fixed length of only a last predetermined number of writes to the respective sub-drive SD1, SD2 such that, when the list length is filled to its maximum length with recent writes, a next write to the list pushes the oldest write off of the list.

Figure 13:
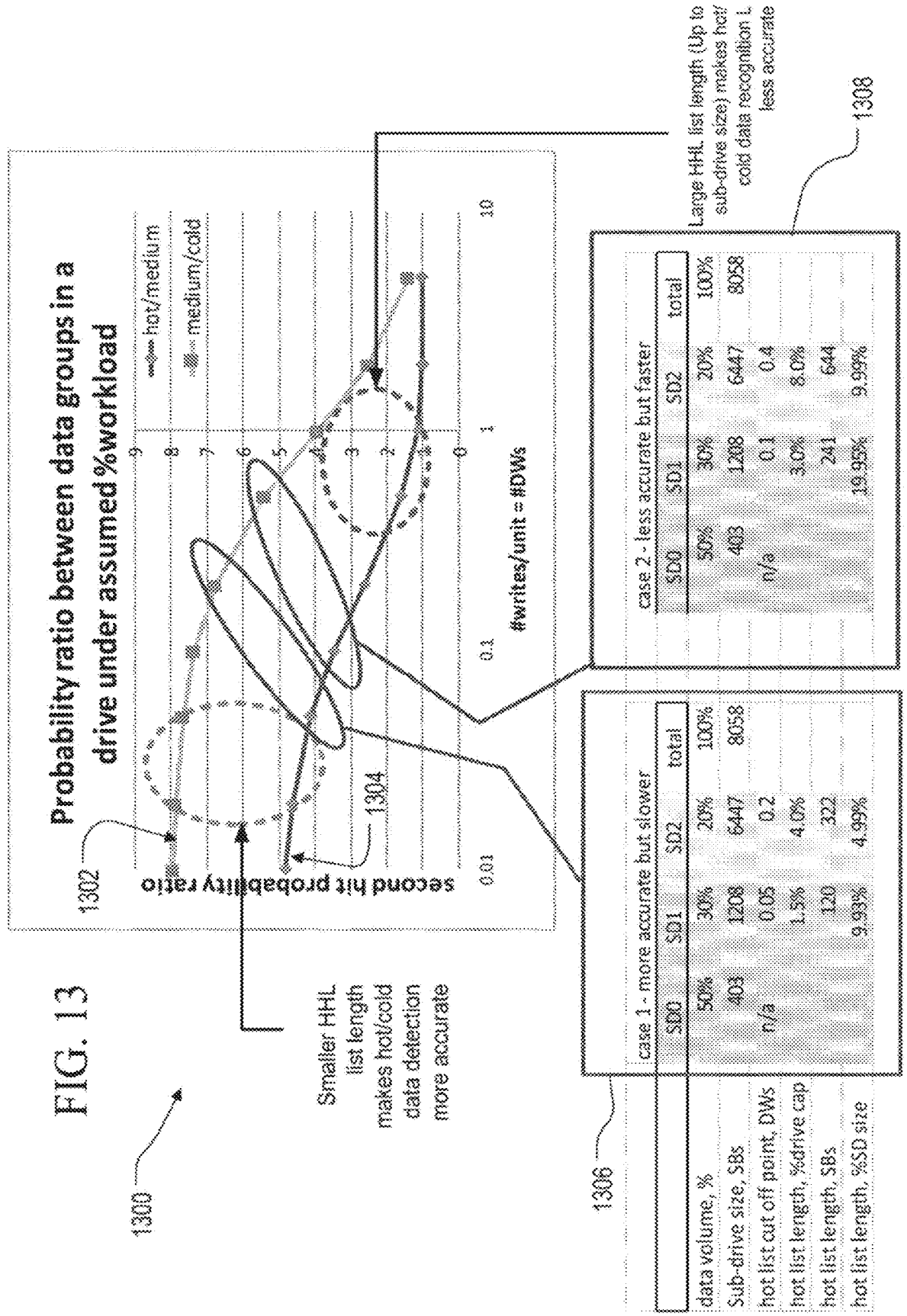
FIG. 13 is a hypothetical plot of responsiveness of sub-drives to changing workload based on different hot host list size.

The initial host write sort may reduce the endurance penalty due to inaccuracies of hot/cold data copies while not requiring a lot of system resources. It is based on indirect measurement of host write density using block-level algorithm with adjustable accuracy-speed ratio as illustrated in FIG. 13.

Figure 14:
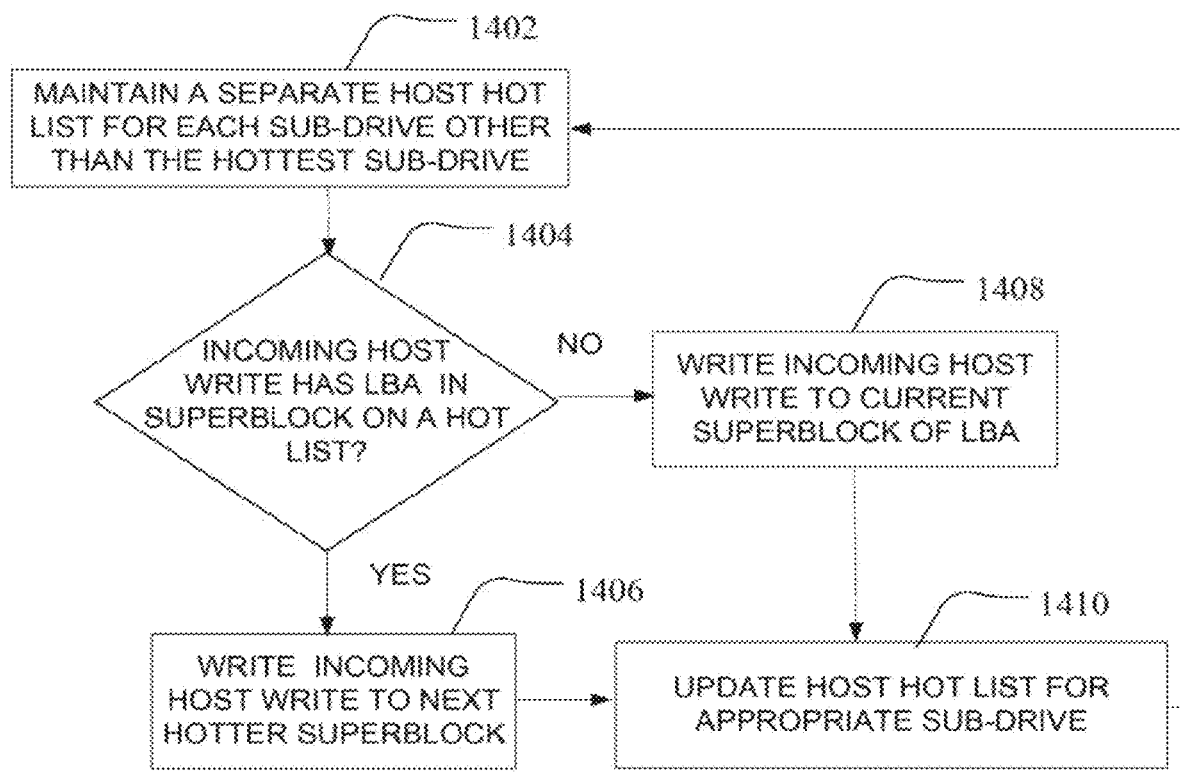
FIG. 14 is a flow diagram setting forth an embodiment of initial host write data sorting to sub-drives based on a recent host write density determination.

Referring to FIGS. 12 and 14, the initial host write sorting method may include maintaining a FIFO (first in first out) list of recently written, by host writes, superblocks for each sub-drive other than the hottest sub-drive (at 1402). The number of recent host superblock writes tracked for each sub-drive SD1, SD2 may be the same number of blocks HHL1 for SD1, HHL2 for SD2. It is assumed that a hit of an LBA within the relatively small number of HHL1 or HHL2 recently written blocks is a strong indicator of higher write density per unit, and is used to trigger re-mapping of an LBA to a hotter sub-drive in certain circumstances. If a new host write comes in and invalidates an LBA currently stored in any of the blocks that are on the FIFO lists HHL1, HHL2 (at 1404), the new data is not written in the open block in that sub-drive but instead is written the next hottest one, for example from SD1 to SD0, or from SD2 to SD1 (at 1406). In contrast, if the new host write does not invalidate an LBA in one of the host hot lists (at 1404), then the incoming data may be written to the sub-drive that already has the LBA in it (at 1408). After a new host write to a superblock occurs, whether it hits on LBAs in a superblock already on the list or not, the new superblock write is added to the appropriate hot host list in the sub-drive written to (at 1410). If the hot host list is already full, then the oldest of the recent host writes to that sub-drive on the sub-drive's hot host list is dropped off of the list.

Eventually, the new hot data being remapped, for example from SD1 to SD0, triggers remapping of one of the oldest block from SD0 to SD1 (see dashed lines between SD0 and SD1 in FIG. 12 representing re-mapping flows). The re-mapping may be triggered, as discussed in FIG. 10, due to overflow of the proportion of logical address space allotted to SD0. Thus, the coldest superblock in SD0 is no longer considered 'hot', regardless of amount of obsolete data in it, and this re-mapping makes sure that no stale colder data is stuck in SD0. Remapping to a colder sub-drive is done logically, without a reclaim (garbage collection) copy, as discussed above.

If the workload pattern changes so that host write 'hot spot' moves to another set of LBAs, the data remapping from sub-drive to sub-drive will happen as soon as the host writes the hot data twice, in cases where the second host write to the LBA happens within the fixed number of writes tracked in HHL1 or HHL2, while cold data will get re-mapped to a colder SD. In other embodiments, a host hot lists (HHL1 and HHL2) may also include a super-block written by garbage collection and not just host writes if there are not enough blocks written by the host or/and there are GC blocks containing relatively recently written data (for example, when the superblocks on the HHLs are garbage collected and thus the garbage collection superblocks contain hot data). Ordering within the list would maintain the order to keep the block in approximate order of time since written by the host. For example, in one implementation where the HHLs include garbage collection activity as well as host writes, the HHL may be the left-most entries (e.g. most recent 4 entries) of the data age lists 800 or 802 of FIG. 8A or 8B used for a particular sub-drive.

Referring to FIG. 13, a hypothetical probability ratio between data groups in a NVM system 100, assuming the workload and capacity distribution of FIG. 12, is shown. The plot 1300 in FIG. 13 is built using Poisson function as an approximation to Binomial distribution. If the workload pattern is stable, like in workload pattern of FIG. 12, such as an enterprise SSD workload standard suggested by the JEDEC Solid State Technology Association of Arlington, Va., the 'noise' remapping from sub-drive to sub-drive may be minimized, as most data from different temperature groups may be distinguishable due to write density per unit being used as an indicator (40:5:1 ratio in JEDEC) instead of prior methods of using the probability of data group hit (only 5:3:2 ratio in JEDEC). The diagram shows difference in accuracy of separating hot data from medium, and medium from cold.

The left-most points of the plot in FIG. 13, where HHL1 size is the lower (hot/medium) trace 1304 and the HHL2 size is the upper (medium/cold) trace 1302, is at the point equivalent to 0.01 DW (1% of drive capacity written). In this case, the probability of a host write hitting an LBA within the HHL1 and HHL2 FIFO lists is close to write density per unit (40:5:1 ratio in JEDEC). The right-most point of the plot in FIG. 13 illustrates a hypothetical large HHL1 and HHL2 size (containing up to the full list of superblocks of the sub-drive), equivalent to 1 to 5 DWs, as typical time between writes. In this case, the probability of host write may be close to the probability of the data group hit (only 5:3:2 ratio in JEDEC).

Although the initial host write sorting method of FIGS. 12-14 are described in the context of working with the specific data management process of FIG. 10, the method and system of FIGS. 12-14 may be used independently from the techniques of FIG. 10 and instead may be used alone or in combination with other sub-drive data management systems and techniques. FIG. 13 also shows hypothetical cases of setting the size of the HHLs (HHL1 for SD1 and HHL2 for SD2 in the example of FIG. 12) larger or smaller and the associated tradeoffs. in the first case 1306, where the lengths HHLs are smaller, the expected accuracy of hot and cold data sorting using the methods described herein is expected to be higher, but proceed at a slower pace than the second case 1308, where the HHL sizes are shown as larger. The two HHL cases 1306, 1308 are illustrated for the particular logical sub-drive sizing and workload distribution of the example of FIG. 12, and assume a specific number of superblocks (SBs), however these cases 1306 and 1308 are simply provided by way of example and other sub-drive sizes, superblock numbers, and workload distributions are also contemplated.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for managing received data in a multiple sub-drive non-volatile memory system. The data may be managed through a direct write process where data is routed through an initial sorting algorithm to sub-drives in non-volatile memory and subsequent sorting of data and garbage collection operations in the non-volatile memory are performed independently of one another. Separately, or in combination with the independent garbage collection and logical sorting of superblocks of data, a method of initially sorting host write data into sub-drives based on a write density temperature measurement is disclosed. The systems and methods may permit reduction of write amplification, and thus overall improvement of IOPS, for a non-volatile memory system.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A storage system, comprising:
   storage memory having sub-drives, the sub-drives comprising a first sub-drive and a second sub-drive;
   one or more controllers configured to cause:
   providing an identification of one or more recently written superblocks for the first sub-drive;
   receiving a first data from a host write; and
   when the host write invalidates a logical block address associated with the one or more recently written superblocks for the first sub-drive:
   writing the first data into the second sub-drive that is next hotter than the first sub-drive; and
   refraining from writing the first data into an open block in the first sub-drive.

2. The storage system of claim 1, wherein the one or more controllers are configured to cause:
   when the host write does not invalidate the logical block address associated with the one or more recently written superblocks for the first sub-drive, writing the first data into the open block in the first sub-drive,
   wherein the first sub-drive includes a block corresponding to the logical block address.

3. The storage system of claim 2,
   wherein providing the identification of the one or more recently written superblocks for the first sub-drive comprises providing the identification for only a predetermined number of the one or more recently written superblocks for the first sub-drive, and
   wherein the one or more controllers are configured to cause:
   updating the identification of the one or more recently written superblocks for the first sub-drive when the first data is written into the open block of the first sub-drive; and
   when a quantity of the one or more recently written superblocks exceeds the predetermined number, removing an identification of an oldest recently written superblock for the first sub-drive from the identification of the one or more recently written superblocks for the first sub-drive.

4. The storage system of claim 1, wherein the one or more controllers are configured to cause:
   moving data previously stored in the first sub-drive into a different sub-drive of the storage memory by re-mapping at least a portion of the data previously stored in the first sub-drive, without rewriting the at least a portion of the data previously stored in the first sub-drive, into a different physical location of the storage memory.

5. The storage system of claim 4, wherein moving the data previously stored in the first sub-drive comprises moving the data previously stored in the first sub-drive into the different sub-drive of the storage memory, independently of any garbage collection operation in the first sub-drive.

6. The storage system of claim 4, wherein:
   the at least a portion of the data previously stored in the first sub-drive comprises a superblock of the first sub-drive;
   the different sub-drive comprises a next colder sub-drive of the sub-drives, wherein the next colder sub-drive comprises a sub-drive associated with data having a data temperature less than a data temperature of data associated with the first sub-drive; and
   re-mapping the at least a portion of the data previously stored in the first sub-drive comprises selecting a coldest superblock of the first sub-drive and re-mapping the coldest superblock to the different sub-drive.

7. The storage system of claim 4, wherein:
   the at least a portion of the data previously stored in the first sub-drive comprises a superblock of the first sub-drive;
   the different sub-drive comprises a next hotter sub-drive of the sub-drives, wherein the next hotter sub-drive comprises a sub-drive associated with data having a data temperature greater than a data temperature of data associated with the first sub-drive; and
   re-mapping the at least a portion of the data previously stored in the first sub-drive comprises selecting a hottest superblock of the first sub-drive and re-mapping the hottest superblock to the different sub-drive.

8. The storage system of claim 1, comprising:
   an open block group, comprising superblocks assignable to any of the sub-drives for data storage,
   wherein the one or more controllers are configured to cause:
   initiating a garbage collection operation in one of the sub-drives in response to detecting that an amount of the superblocks in the open block group is below a predetermined minimum threshold; and selecting a source superblock for the garbage collection operation from a sub-drive having an amount of overprovisioning that is greater than a target overprovisioning for the sub-drive.

9. The storage system of claim 1, wherein the one or more controllers are configured to cause: when valid data is relocated during a garbage collection operation, relocating the valid data only within a same sub-drive of the storage memory.

10. The storage system of claim 1, wherein the one or more controllers are configured to cause:
re-mapping at least a portion of data stored in the first sub-drive when an amount of valid data in the first sub-drive exceeds a predetermined amount of logical address space assigned to the first sub-drive.

11. A method for a storage system, the method comprising:
providing an identification of one or more recently written superblocks for a first sub-drive of storage memory;
receiving a first data from a host write; and
when the host write invalidates a logical block address associated with the one or more recently written superblocks for the first sub-drive:
writing the first data into a second sub-drive that is next hotter than the first sub-drive; and
refraining from writing the first data into an open block in the first sub-drive.

12. The method of claim 11, comprising:
when the host write does not invalidate the logical block address associated with the one or more recently written superblocks for the first sub-drive, writing the first data into the open block in the first sub-drive,
wherein the first sub-drive includes a block corresponding to the logical block address.

13. The method of claim 11, comprising:
moving data previously stored in the first sub-drive into a different sub-drive of the storage memory by re-mapping at least a portion of the data previously stored in the first sub-drive, without rewriting the at least a portion of the data previously stored in the first sub-drive, into a different physical location of the storage memory.

14. The method of claim 13, wherein moving the data previously stored in the first sub-drive comprises moving the data previously stored in the first sub-drive into the different sub-drive of the storage memory, independently of any garbage collection operation in the first sub-drive.

15. The method of claim 11, wherein:
the storage memory comprises an open block group, the open block group comprising superblocks assignable to any of sub-drives of the storage memory; and
the method comprises:
initiating a garbage collection operation in one of the sub-drives in response to detecting that an amount of the superblocks in the open block group is below a predetermined minimum threshold; and
selecting a source superblock for the garbage collection operation from a sub-drive of the storage memory having an amount of overprovisioning that is greater than a target overprovisioning for the sub-drive.

16. The method of claim 11, comprising:
when valid data is relocated during a garbage collection operation, relocating the valid data only within a same sub-drive of the storage memory.

17. The method of claim 11, comprising:
re-mapping at least a portion of data stored in the first sub-drive when an amount of valid data in the first sub-drive exceeds a predetermined amount of logical address space assigned to the first sub-drive.

18. An apparatus, comprising:
means for providing an identification of one or more recently written superblocks for a first sub-drive of storage memory;
means for receiving a first data from a host write; and
when the host write invalidates a logical block address associated with the one or more recently written superblocks for the first sub-drive:
means for writing the first data into a second sub-drive that is next hotter than the first sub-drive; and
means for refraining from writing the first data into an open block in the first sub-drive.

19. The apparatus of claim 18, comprising:
when the host write does not invalidate the logical block address associated with the one or more recently written superblocks for the first sub-drive, means for writing the first data into the open block in the first sub-drive,
wherein the first sub-drive includes a block corresponding to the logical block address.

20. The apparatus of claim 18, comprising:
means for moving data previously stored in the first sub-drive into a different sub-drive of the storage memory,
wherein the means for moving comprises means for re-mapping at least a portion of the data previously stored in the first sub-drive, without rewriting the at least a portion of the data previously stored in the first sub-drive, into a different physical location of the storage memory.

* * * * *